Patented Dec. 19, 1939

2,184,237

UNITED STATES PATENT OFFICE 2,184,237

COLORING FRUIT

Kenneth H. Klipstein, New Vernon, N. J., assignor, by mesne assignments, to American Cyanamid Company, New York, N. Y., a corporation of Maine No Drawing. Application June 8, 1939, Serial No. 278,086

5 Claims. (Cl. 99—103)

This invention relates to improvements in the art of imparting additional color to citrus fruit and is more particularly concerned with improvements in the coloring of oranges.

Commercial methods employed heretofore in the coloring of oranges have not been entirely satisfactory and an improved method is desirable. One of the more successful methods used in the past employed a solution of a water insoluble dye and a volatile solvent such as kerosene, this being suspended in an aqueous soap solution. This mixture or emulsion was brought into contact with the oranges either by spraying the oranges or by immersing them in a bath. The use of a volatile solvent was not satisfactory because of the tendency of the solvent to remove valuable constituents of the fruit peel. Another disadvantage was the loss of solvent when the bath was heated, causing a variation in the concentration of the dye material.

An improved method eliminated the use of the kerosene when it was found that certain dyestuffs, such as those obtained by coupling diazotized toluidine, aniline or xylidine on beta naphthol, could be used alone in an aqueous soap solution or a suspension. This method, although an improvement over the process employing kerosene, was still not entirely satisfactory as the conditions under which it had to be used resulted in injury to the fruit. In order to impart sufficient color to the oranges, this method required that they be immersed in a bath of the soap solution at a temperature of 130° F. and remain immersed for a period of 5-10 minutes. The high temperature and the length of time necessary to keep the oranges in the bath results in some injury to the quality of the fruit, especially to the peel. When a concentrated suspension of the color, which requires a larger amount of the soap to hold the color in suspension, is used in an attempt to speed up the coloring action or to cut down the temperature, there is a tendency for the dye to be absorbed unevenly, giving the fruit a spotty appearance.

The inefficiency of aqueous soap solutions or suspensions of dyes for coloring oranges has been found to be very largely due to the insolubility or lack of dispersibility of the dye materials used. For example, the dye produced when mixed xylidines are diazotized and coupled on beta naphthol has a color suitable for oranges but because of the insolubility or lack of dispersibility in aqueous soap solutions its use for commercial coloring of oranges is not entirely satisfactory. According to the present invention, it has been determined that the relative insolubility or lack of dispersibility in an aqueous soap solution of the dye material produced by diazotization and coupling of mixed xylidines on beta naphthol is due primarily to the large amount of the meta isomer present. When xylene azo beta naphthol is produced containing none of the meta isomer, the solubility or dispersibility in aqueous soap solutions and the value of the material in coloring oranges are very greatly increased. However, the presence of a small percentage of the meta isomer does not materially affect the value of the dye. For example, xylene azo beta naphthol containing less than 30% of the meta isomer is a dye which has very desirable properties, the properties being high tinctorial value, good solubility or dispersibility in soap solution. The use of this dye permits a lowering of the temperature of dye baths ordinarily used by about 10° F., a sufficient difference to prevent damage to the peel.

An improved dyestuff according to the present invention can be prepared by converting mixed xylidines to the xylidine acetates and separating the meta isomer by reason of its relative insolubility and the mixture of ortho and para xylidines recovered by neutralization of the corresponding acetates with an alkali. This product, diazotized in the usual manner and coupled on beta naphthol in an alkaline solution, results in the production of a xylene azo beta naphthol material containing a low percentage of the meta isomer. This dye is isomeric with the dye listed in the "Colour Index" as Sudan II, but differs in that its contains a relatively small amount of the meta isomer. The dye is oil soluble, water insoluble, sun fast, and readily dispersible in aqueous soap solution producing a red orange color particularly well adapted for coloring oranges.

It is an advantage of the present invention that this dye when used in imparting color to oranges permits altering of conditions that will enable the imparting of varying degrees of color to oranges. For example, the oranges may be immersed in a bath of an aqueous potassium oleate soap solution containing from 0.1-2.0% of the soap and from 0.01-0.2% of the improved xylene azo beta naphthol dispersed therein and allowed to remain for a period of from 2-10 minutes. The temperature of the bath may be varied from 100°-125° F.

It is also an advantage of the present invention that the temperature of the bath can be decreased if the amount of the soap and the dye are increased proportionately, within the ranges indicated, which is an important factor in preventing injury to the peel, and the improved dispersibility and strong tinctorial properties of this dye in soap solution results in a speeding up of coloring action over previous dye baths and thus further aids in cutting down injury to the peel of the fruit.

A further advantage of this invention is that the concentration of the soap solution is less than that ordinarily required, and this decreases the foaming difficulties which are encountered when a concentrated soap solution is used. This is also important economically because it permits the use of apparatus of the type now employed in fruit treating processes and hence it is not necessary to install expensive equipment to practice the process.

The invention will be described in conjunction with a specific example which is used to illustrate the invention and is not to be construed as limiting the scope of the invention.

EXAMPLE

*Removal of the meta isomer from commercial mixtures of ortho, meta and para xylidine*

37.2 pounds of glacial acetic acid were added to 100 pounds of mixed xylidines at such a rate that the temperature did not exceed 35° C. and the mixture was stirred for 1 hour after the addition of the acid. The charge was allowed to set in the reaction vessel for 3 days during which time the temperature dropped to about 20° C. The crystals of meta xylidine acetate were then separated from the mother liquor by the use of a centrifuge. The mother liquor was then neutralized with 20% caustic solution until the mixture tested alkaline to phenolphthalein. Sufficient water was added to completely dissolve the salt formed and the salt solution was separated from the precipitated ortho and para xylidine by the use of a centrifuge. The crude ortho and para xylidine so recovered contained less than 30% meta xylidine.

Diazotization 250 pounds of water were charged into a wooden tub and 48.5 pounds of 33% C. P. hydrochloric acid added. To this were added 24.2 pounds of the crude ortho and para xylidine. The mixture was diazotized in the usual manner at 0° C. with 13.8 pounds of sodium nitrite. The diazotization was complete after 1 hour.

Preparation of beta naphthol solution 200 pounds of water were charged into a wooden tub and 18 pounds of sodium hydroxide dissolved therein. To this were added 29 pounds of beta naphthol. This mixture was heated to 70°–75° C. using live steam and was stirred until solution was complete. To this were added 34 pounds of soda ash and the stirring continued until solution was complete. The solution was cooled with ice to 0° C. The total volume was then equivalent to 680 pounds of water.

Coupling

The diazo was added to the alkaline beta naphthol solution in about 8 seconds. There was no test for diazo as shown by testing the coupling solution on a filter paper with an alkaline R salt solution. There was always a test for beta naphthol as shown by testing the spot with tetrazodianisidine solution. There was also a strong test on brilliant yellow paper for alkaline reaction. The temperature was maintained at 2° C. or below. The coupling mixture was stirred for 35 minutes.

Filtration

The slurry was pumped into a wooden filter press and the tub was washed with cold water and this also pumped into the filter press. The filter press was then blown dry using compressed air. The dry dyestuff xylene azo beta naphthol was obtained.

Preparation of dye bath

A mixture of 1 part of the dye and 20 parts of a 50% potassium oleate soap solution was warmed to near the boiling point and then diluted with water until the concentration of the dye was reduced to 0.1% and the concentration of the soap to 1%.

Fruit coloring operation

A suitable quantity of the dye bath was heated to 125° F. and the oranges desired to color were immersed in the bath. The temperature of 125° F. was maintained and the oranges were held beneath the surface for a period of 3–5 minutes, depending on the depth of the color required. The bath was agitated during this dyeing operation.

It is to be understood that soaps other than potassium oleate may be used as the dispersing agent and the soap dispersion of the coloring agent may contain other ingredients such as oils, waxes, antiseptics, or wetting agents.

What I claim is:

1. In a process of imparting color to whole citrus fruit the step of subjecting whole citrus fruit to the coloring action of an aqueous soap dispersion of a xylene azo beta naphthol dye containing less than 30% of the meta isomer.

2. In a process of imparting color to whole citrus fruit the step of immersing whole citrus fruit in a warm bath not exceeding 125° F., said bath consisting of an aqueous soap dispersion of a xylene azo beta naphthol dye containing less than 30% of the meta isomer.

3. A process according to claim 2 in which the concentration of the soap in the bath is from 0.1–2.0% and the concentration of the dye is from 0.01–0.2%.

4. A bath for imparting color to oranges comprising an aqueous soap dispersion of a xylene azo beta naphthol dye containing less than 30% of the meta isomer, said dispersion being capable of imparting desirable color to oranges by immersing of oranges therein, at a temperature from 100°–125° F.

5. A bath according to claim 4 which contains from 0.1–2.0% soap and from 0.01–0.2% of the dye.

KENNETH H. KLIPSTEIN.